United States Patent [19]

Hartman

[11] Patent Number: 4,780,039
[45] Date of Patent: Oct. 25, 1988

[54] FASTENER PLATE
[75] Inventor: Richard E. Hartman, Akron, Ohio
[73] Assignee: The B. F. Goodrich Company, Akron, Ohio
[21] Appl. No.: 533,179
[22] Filed: Sep. 19, 1983
[51] Int. Cl.[4] ............................................. F16B 43/00
[52] U.S. Cl. ..................... 411/531; 411/542; 411/369; 411/372; 411/533; 52/410; 52/408; 52/404
[58] Field of Search .............. 411/531, 368, 371, 372, 411/533, 545, 546, 542, 543, 369; 52/410, 408, 404

[56] References Cited

U.S. PATENT DOCUMENTS

| | | | |
|---|---|---|---|
| 1,487,610 | 3/1924 | Schatzel | 411/533 |
| 1,953,592 | 4/1934 | Deniston | 411/371 |
| 3,788,185 | 1/1974 | Gutshall | 411/371 |
| 3,910,588 | 10/1975 | Austin | 411/542 X |
| 4,361,997 | 12/1982 | De Caro | 411/533 X |
| 4,380,413 | 4/1983 | Dewey | 411/161 |

FOREIGN PATENT DOCUMENTS 1027641 4/1966 United Kingdom ............... 411/542

Primary Examiner—Gary L. Smith
Assistant Examiner—Curtis B. Brueske
Attorney, Agent, or Firm—James R. Lindsay

[57] ABSTRACT

A fastener plate for use in association with a fastener in a roof structure is described. The fastener plate includes a disc-shaped plastic member that has a depending central portion extending from its lower planar face and a depending peripheral flange. A metal insert seated in an opening within the plastic member contains an opening through which the fastener can be threaded.

10 Claims, 2 Drawing Sheets

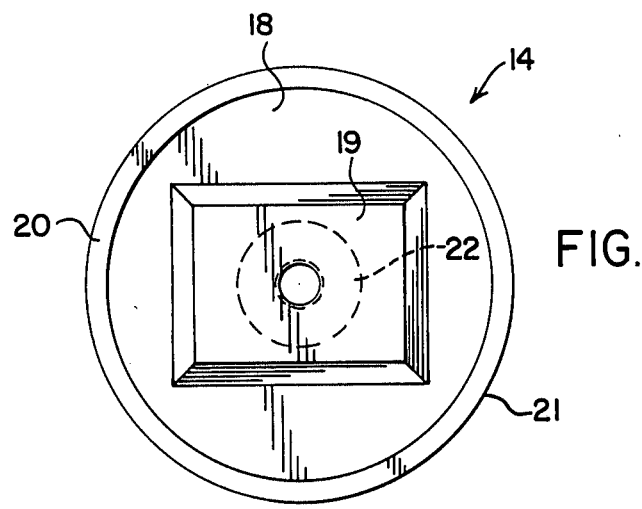
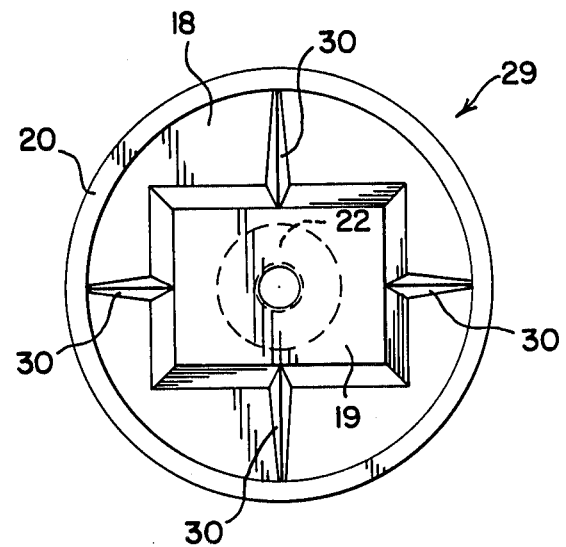

FASTENER PLATE

BACKGROUND OF THE INVENTION

A roof structure often is comprised of a water-impermeable roofing layer disposed over thermal insulation panels supported by a roof deck which may consist of a corrugated steel deck supported by structural I-beams. To secure the water-impermeable roofing layer and thermal insulation panels to the roof deck, fasteners are driven or screwed or otherwise forced through the roofing layer and insulation panels and through the roof deck. The fastener may be associated with a metal plate by threading the fastener through a hole in the metal plate before the fastener is driven or screwed into place in the roof structure. The metal plate is intended to aid in preventing the head of the fastener from being forced through the water-impermeable roofing layer and into the insulation panel. Generally, the conventional metal plate is formed of relatively thin metal sheet material. The metal plate also is intended to hold the roofing layer and insulation panel firmly against the roof deck during those periods when winds are blowing across the roof structure causing an uplift force tending to pull the roofing layer and insulation panels free from the roof deck. The metal plates being relatively thin are subject to edge-bending during installation. When walked upon or when wind uplift forces are created after the roof has been installed, the relatively sharp bent edges of the metal plates often penetrate through the thin roofing layer and destroy the water-impermeable integrity of the roof structure.

A plastic fastener plate intended to overcome many of the deficiencies inherent in the metal plates heretofore used in roof structures is described in U.S. Pat. No. 4,361,997, the disclosure thereof being incorporated herein by reference. In accordance with the disclosure in the aforesaid patent, the plastic plate is comprised of a substantially planar section that has a hub segment depending from the planar section and anti-rotational ribs or splines or the like which are forced into the insulation panels to prevent rotation of the plastic plate after installation. A hole extends through the hub and a counterbore is provided in the planar section to allow a fastener to be assembled with the plastic plate.

The above-described plastic plates cannot be conveniently used when a water-impermeable roofing layer is disposed over the insulation panels since the depending hub segment and ribs or splines cannot easily penetrate into the insulation panels, but, instead would ride on top of the roofing layer. Penetration of the depending hub and ribs or splines into insulation panels that have a relatively thick "skin" surface also would be difficult. Furthermore, even when the hub and ribs or splines of the plastic plate can be forced into the insulation panels as described in the aforementioned patent, difficulty sometimes is experienced when the fastener is driven through the roof deck if too great a driving force is used, since the head of the fastener can cause splitting of the hub segment. Also, when a wind of substantial velocity blows across a roof structure in which such aforesaid plastic plate and fastener assemblies are used, the wind uplift forces are concentrated at the location of the hub segment and tend to cause the fastener head to split the hub segment.

SUMMARY OF THE INVENTION

The present invention provides a plastic fastener plate which can be used in a roof structure that embodies a water-impermeable roofing layer (or membrane) overlying one or more layers of insulative panels and which is not susceptible to fastener "push through" when walked upon or exposed to substantial wind uplift forces. In accordance with the present invention, the plastic fastener plate is comprised of a plastic disc-shaped member having a generally planar upper face and a generally planar lower face with a depending central portion and a depending peripheral flange portion. A metal insert positioned centrally within the plastic disc contains an opening through which the fastener is threaded. The side surface of the opening in the metal insert slopes inwardly as it extends downwardly from the upper face of the metal insert to provide a conical-shaped countersink in the upper surface of the metal insert to receive the head of the fastener. The metal insert resists the forces tending to pull the head of the fastener through the plate. The conical-shaped countersink permits the head of the fastener to gimbal within the opening of the metal insert to accommodate for slight misalignment of the fastener within the fastener plate when the assembly is installed in the roof structure and to allow a degree of pivotal movement of the fastener plate relative to the fastener when wind uplift forces occur. The depending central portion and peripheral flange of the fastener plate of the present invention provides firm contact of the plastic disc with the roof structure and allows broader distribution of forces over the surface of the disc which are generated when the disc is stepped upon after installation in the roof structure. The depending peripheral flange also provides extra strength along the peripheral zone of the disc.

The invention will be more fully understood from the following detailed descriptions of embodiments of the invention.

IN THE DRAWINGS

FIG. 4 is a bottom plan view of the fastener plate shown in FIG. 1; and

FIG. 5 is a bottom plan view of another embodiment of a fastener plate within the purview of the present invention.

DETAILED DESCRIPTION OF THE INVENTION

Figure 1:
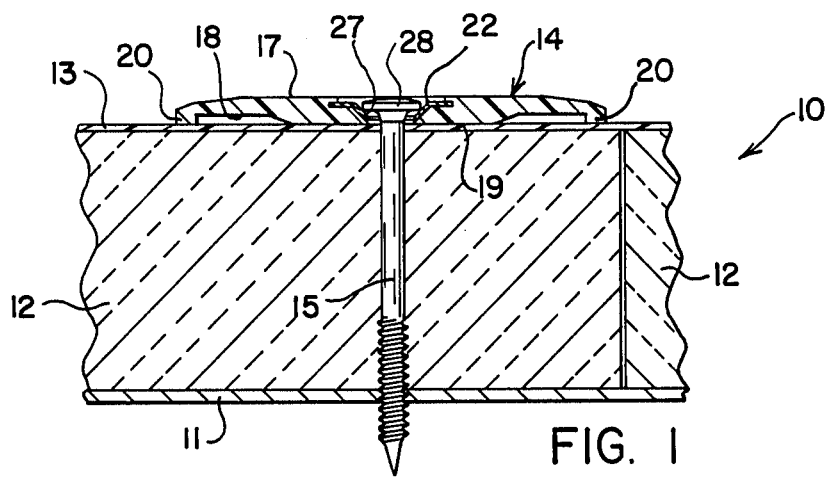
FIG. 1 is a cross-sectional view of a roof structure illustrating the use of a fastener plate embodying the present invention.
Figure 2:
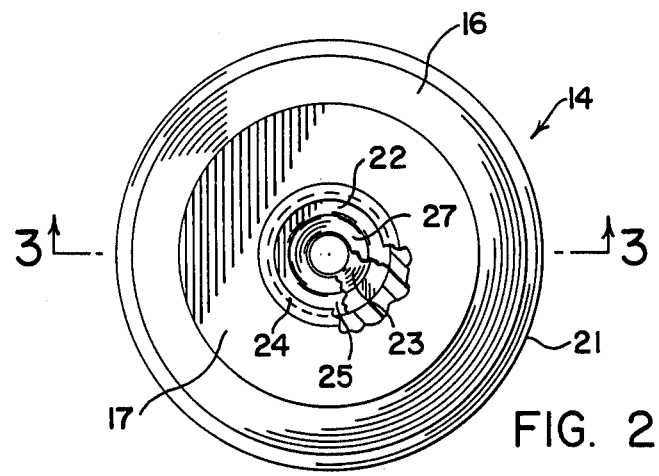
FIG. 2 is a top plan view of the fastening plate shown in FIG. 1.
Figure 3:
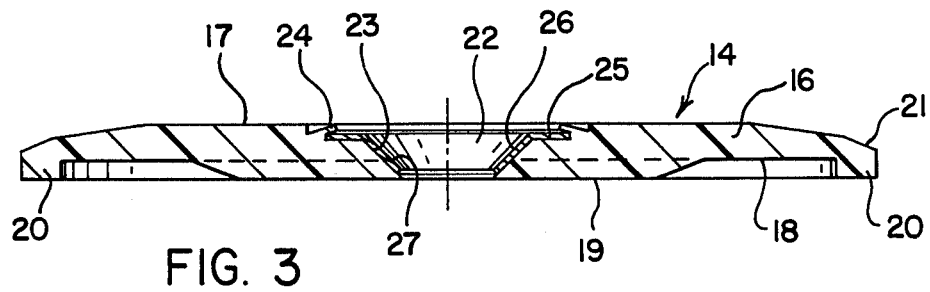
FIG. 3 is a sectional view on line 3—3 of FIG. 2.

FIG. 1 of the drawings shows a roof structure 10 comprised of a conventional metal deck 11 (generally made of corrugated steel sheet) supported by I-beams or other appropriate supporting members (not shown), over which is disposed insulation panels 12, 12 of thermal insulation material positioned in side-by-side abutting relationship and a water-impermeable roofing layer 13 positioned over panels 12, 12. Roofing layer 13 and panels 12, 12 are secured to roof deck 11 by fastener assemblies comprised of a fastener plate 14 and a fastener 15. The fastener 15 is driven or screwed or otherwise forced through roofing layer 13, insulation panel 12 and metal deck 11 by any convenient means.

In accordance with the present invention, fastener plate 14 is comprised of an essentially circular disc-shaped plastic plate member 16 that has a generally planar upper face 17 and a generally planar lower face 18. A depending essentially flat-bottomed central portion 19 protrudes downwardly from said lower face 18. Although the aforesaid depending central portion 19 of plate member 16 is shown to be a generally rectangular-shaped depending element (see FIG. 4), it will be understood that the depending element 19 can be different shapes (for example, a cylindrical-shaped depending element). A flange element 20 depends from the peripheral zone 21 of plate member 16 a distance essentially equal to that of the depending central portion 19 whereby the bottom reaches of central portion 19 and flange element 20 rest firmly on the roof structure and provide a broad supporting base for the fastener plate 14 so that even if fastener plate 14 is stepped upon after installation it will set firmly on the roof surface without teetering or seesawing, eliminating the tendency experienced with certain other designs of fastener plates to cut through the water-impermeable roofing layer if the plate were stepped upon. Depending flange 20 also provides additional rigidity and strength to the peripheral zone 21 of fastener plate 14 and assists in protecting the peripheral edge area of fastener plate 14 against being damaged.

A metal insert 22 positioned centrally within fastener plate 14 is seated in an opening 23 in fastener plate 14 and is firmly held in place by a retaining element 24 of plate member 16 that projects inwardly over the upper peripheral edge 25 of metal insert 22. Although retaining element 24 is shown to be an uninterrupted flange, it will be evident that the retaining element 24 can consist of interrupted segments or other means for holding the metal insert 22 firmly in place within fastener plate 14. Metal insert 22 has an opening 26 extending therethrough and in alignment with opening 23 in fastener plate 14 to provide a cental opening in fastener plate 14 through which fastener 15 is threaded to form the fastener assembly used for securing roofing layer 13 and panels 12, 12 to the roof deck 11. The side surface 27 of opening 26 in metal insert 22 slopes inwardly as it extends downwardly from the upper face of metal insert 22 to provide a conical-shaped countersink in the upper surface of metal insert 22 to receive the head 28 of fastener 15, so that the head does not extend above the upper face of the fastener plate 14. The conical-shaped countersink formed by the side surface 27 of opening 26 permits the head 28 of fastener 15 to gimbal within opening 26 to accommodate for slight misalignment of the fastener 15 within fastener plate 14 when the fastener is driven or screwed through roofing layer 15 and panel 14 and through roof deck 11 and to allow a degree of pivotal movement of fastening plate 14 relative to fastener 15. The metal insert 22 is formed of a metal that has sufficient structural strength to adequately resist forces tending to pull head 28 of fastener 15 through the metal insert 22. Desirably, the metal insert 22 is made of the same metal as fastener 15 to avoid any problem arising from a galvanic reaction between two different metals.

In another embodiment of the fastener plate of the present invention, as shown in FIG. 5, the fastener plate 29 is of the same construction as fastener plate 14 (with plate member 16, a centrally located depending portion 19, depending peripheral flange 20 and metal insert 22, etc.) but has, in addition, a plurality of spaced, radially-extending depending ribs 30, 30 extending downwardly from the lower face 18 of plate member 16 a distance no greater than the bottom reaches of central portion 19 and flange 20, the depending ribs 30, 30 providing additional rigidity to the fastener plate 29.

The plastic plate member 16 of fastener plates 14 and 29 can be formed of any suitable thermoplastic or thermosetting resinous material that has adequate strength and rigidity without being so brittle as to easily shatter when walked upon. Suitable materials which may be used include high density polyethylene resins, polypropylene resins and high impact ABS resins.

The fastener plate can be formed in any convenient manner. For example, the plastic plate member 16 (but without retaining element 24) can be formed by a molding operation, the metal insert 22 can be inserted in opening 23 of the plate member 16 and the retaining element 24 then can be formed to hold the metal insert 22 in place.

The invention is susceptible to various alterations and modifications and is not intended to be limited to the specific embodiments described above.

I claim:

1. A unitary fastener plate for use with a fastener in a roof structure, said fastener comprising:
    (a) a generally disc-shaped plastic member having a generally planar upper face and a generally planar lower face and having an essentially flat-bottomed central portion depending from said lower face and a flange depending from said lower face along the peripheral zone of said plastic member a distance essentially the same as the distance said central portion depends from said lower face of said plastic member and having an opening therein extending from said upper face of said plastic member downwardly through said central portion depending from said lower face of said plastic member;
    (b) a metal insert seated in said opening within said plastic member and having an opening extending therethrough in communication with the first said opening to provide an opening through said fastener plate through which said fastener can be threaded, the side surface of said opening in said metal insert sloping inwardly as said surface extends downwardly to provide a generally conical-shaped countersink in the upper surface of said metal insert; and
    (c) retainer means for retaining said metal insert firmly seated within said opening in said plastic member to form a unitary structure.

2. The fastener plate of claim 1 wherein said depending flange member is an uninterrupted member extending along the entire peripheral zone of said plastic member.

3. The fastener plate of claim 1 wherein said retainer means is comprised of an uninterrupted flange element of said plastic member that extends over the upper peripheral edge of said metal insert.

4. The fastener plate of claim 2 wherein said retainer means is comprised of an uninterrupted flange element that extends over the upper peripheral edge of said metal insert.

5. The fastener plate of claim 1 wherein said plastic member has a plurality of spaced, radially-extending depending ribs extending downwardly from said lower face of said plastic member a distance no greater than the bottom reaches of said depending central portion and said peripheral flange of said plastic member.

6. The fastener plate of claim 5 wherein said depending ribs extend radially outwardly from said central portion of said plastic member.

7. The fastener plate of claim 5 wherein said depending flange member is an uninterrupted member extending along the entire peripheral zone of said plastic member.

8. The fastener plate of claim 5 wherein said retainer means is comprised of an uninterrupted flange element of said plastic member that extends over the upper peripheral edge of said metal insert.

9. The fastener plate of claim 6 wherein said depending flange member is an uninterrupted member extending along the entire peripheral zone of said plastic member.

10. The fastener plate of claim 6 wherein said depending flange member is an uninterrupted member extending along the entire peripheral zone of said plastic member and wherein said retainer means is comprised of an uninterrupted flange element of said plastic member that extends over the upper peripheral edge of said metal insert.

* * * * *